United States Patent [19]

Scarborough

[11] Patent Number: 4,613,396

[45] Date of Patent: Sep. 23, 1986

[54] PROCESS AND APPARATUS FOR JOINING CARPETING

[76] Inventor: Jimmy M. Scarborough, 1625 Minerva Ave., Jacksonville, Fla. 32207

[21] Appl. No.: 589,329

[22] Filed: Mar. 14, 1984

[51] Int. Cl.[4] .................. B32B 35/00; B65H 69/06
[52] U.S. Cl. .................. 156/391; 118/207; 156/304.4; 156/505; 156/509; 156/575; 156/577; 156/578; 156/579; 222/146.2; 222/323; 222/330; 222/473; 401/131; 401/139; 401/266
[58] Field of Search .................. 156/152, 304.1, 304.3, 156/304.4, 304.6, 304.7, 391, 505, 509, 524, 526, 575, 577, 578, 579; 401/130, 131, 139, 263, 266; 118/271, 207, 101; 222/146.2, 323, 325, 330, 473, 482

[56] References Cited

U.S. PATENT DOCUMENTS

| | | | |
|---|---|---|---|
| 1,150,536 | 8/1915 | Reiser et al. | 401/263 |
| 1,395,635 | 11/1921 | Finizio | 219/245 |
| 1,743,474 | 1/1930 | Norfolk | 156/391 |
| 1,924,551 | 8/1933 | Higgins | 156/391 |
| 3,007,837 | 11/1961 | Goode, Jr. | 156/575 |
| 3,279,971 | 10/1966 | Gardener | 401/266 |
| 3,365,746 | 1/1968 | Gott | 401/139 |
| 3,713,947 | 1/1973 | Hawkins | 156/578 |
| 4,069,087 | 1/1978 | Luke et al. | 156/391 |
| 4,220,114 | 9/1980 | Radowicz | 156/578 |

Primary Examiner—Michael Wityshyn
Attorney, Agent, or Firm—Arthur G. Yeager

[57] ABSTRACT

A process and apparatus for joining two abutting pieces of carpet. The process comprises applying to the carpet backing along both sides of the juncture a strip of hot molten glue at about 210°–425° F. and applying a joining tape to the strip of molten glue, pressing together the tape, glue and carpet backing to cause the glue to soften and penetrate both the tape and the backing, and allow the glue to cool and solidify into a fused and unitary bond. The apparatus comprises a hot glue dispensing gun with a nozzle and a glue applicator attached to the nozzle for uniformly dispensing a strip of glue, a roll of joining tape fed from above and adjacent to the applicator, and a spring loaded roller to press the tape onto the top of the glue strip.

21 Claims, 14 Drawing Figures

PROCESS AND APPARATUS FOR JOINING CARPETING

BACKGROUND OF THE INVENTION

Carpeting is manufactured in endless strips of standard widths, e.g., 9, 12, 15 or 18 feet, and is sold as a roll of any convenient length, e.g., 20-50 feet. In order to apply that carpeting to the floor of a house as a wall-to-wall covering, the carpeting must be cut and pieces joined together to produce the final desired shape of the floor of each room. One method of joining carpeting is to sew the two abutting pieces and a backing strip of fabric binder together to make a strong seam. While this method produces a satisfactory product, it is slow and expensive in that it requires much time of a skilled craftsman. Furthermore, it is not easily accomplished at the site where the carpeting is being laid.

To solve this problem, a glueing technique was developed employing as a binding tape a wide strip (e.g., 4 inches) of paper with a reinforcing fabric lattice (e.g., 3 inches) lightly glued to the paper. This tape may also have a solidified layer of glue applied over the fabric lattice. The tape is placed over the abutting edges of the carpet to be joined and glued in place. In the case of the preglued tape, a hot iron is applied to the tape causing the glue to melt and penetrate the carpet backing. In the case of the tape having no preapplied layer of glue, hot molten glue is applied to the tape and the carpet backing and the tape is pressed into place by use of a hot iron applied to the back of the tape. In either prior art instance, the ironed tape is then allowed to cool, causing the glue to solidify, and the carpet is then ready for use. These later techniques are quick and easy to employ, and can be done at the site where the carpet is being fitted to a room and installed on the floor. The prior art techniques, however, have deficiencies which the present invention substantially overcomes. While the paper tape of the prior art produces a strong joint with respect to tensile strength, it produces a joint that has no bending strength. The newly taped joined carpet of the prior art readily bends along the juncture line and shows the edges of the carpet pieces that were joined by the tape. Frequently, the juncture line is readily apparent to one walking on the carpet after it is installed, and this is aesthetically undesirable. Furthermore, the glue frequently does not spread evenly upon application of the hot iron leaving irregularities which cause the carpeting not to be smooth. The paper tape of the prior art also is not suitable for joining carpeting that is to be used outdoors, because the paper deteriorates in the weather.

A more modern development is the fabrication of carpeting or area rugs from two or more different pieces of carpet to produce a design of different colors and/or textures. Such carpets are produced by cutting appropriate pieces from different carpets and assembling the cut pieces to produce a carpet or rug of the selected design. The assembly of such a designer rug or carpet requires that the cut pieces be joined along abutting edges by sewing and/or glueing. The prior art glueing procedures are not capable of producing a high quality designer carpet, particularly where the design comprises curved lines, because the wide tape could not follow the curves properly since the tape edges would overlap or cutting gussets from the tape would be required to permit it to follow a curved line. The apparatus and process of this invention provide a means for substantially overcoming these deficiencies of the prior art as applied to designer rugs or carpets.

It is a general object of this invention to provide an improved process for joining carpet pieces. It is another general object of this invention to provide an improved apparatus for joining carpet pieces in accordance with this process. It is still another object to provide an improved process and apparatus for producing designer carpets and rugs. Other objects will appear in the detailed description of this invention which follows.

BRIEF DESCRIPTION OF THE INVENTION

This invention relates to a process for joining two abutting pieces of carpeting which includes the steps of applying to the carpet backing along both sides of the juncture of the two abutting pieces of carpeting a strip of hot molten glue applying thereto a strip of joining tape, pressing such joining tape into the molten glue strip, and allowing the glue to cool and solidify to form a bond between the glue, the tape and the pieces of carpet.

This invention also relates to an apparatus for joining two abutting pieces of carpeting along a juncture line including a hot glue dispensing means in a housing having a nozzle for dispensing hot molten glue, a manually operable valve means connected to said nozzle for selectively releasing hot molten glue through the nozzle, means for supporting a roll of joining tape on said housing to dispense tape to a position rearwardly of the nozzle, a glue applicator attached to the nozzle and having a hollow inlet communicating with a channel means having generally the same width as that of the tape and extending over a portion of both pieces of carpet adjacent the juncture line to deposit a strip of molten glue to the backing of each piece of carpet, and a means mounted on the housing rearwardly of the applicator for pressing the tape into the strip of glue and to cause penetration of the molten glue into the backing of the carpet.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
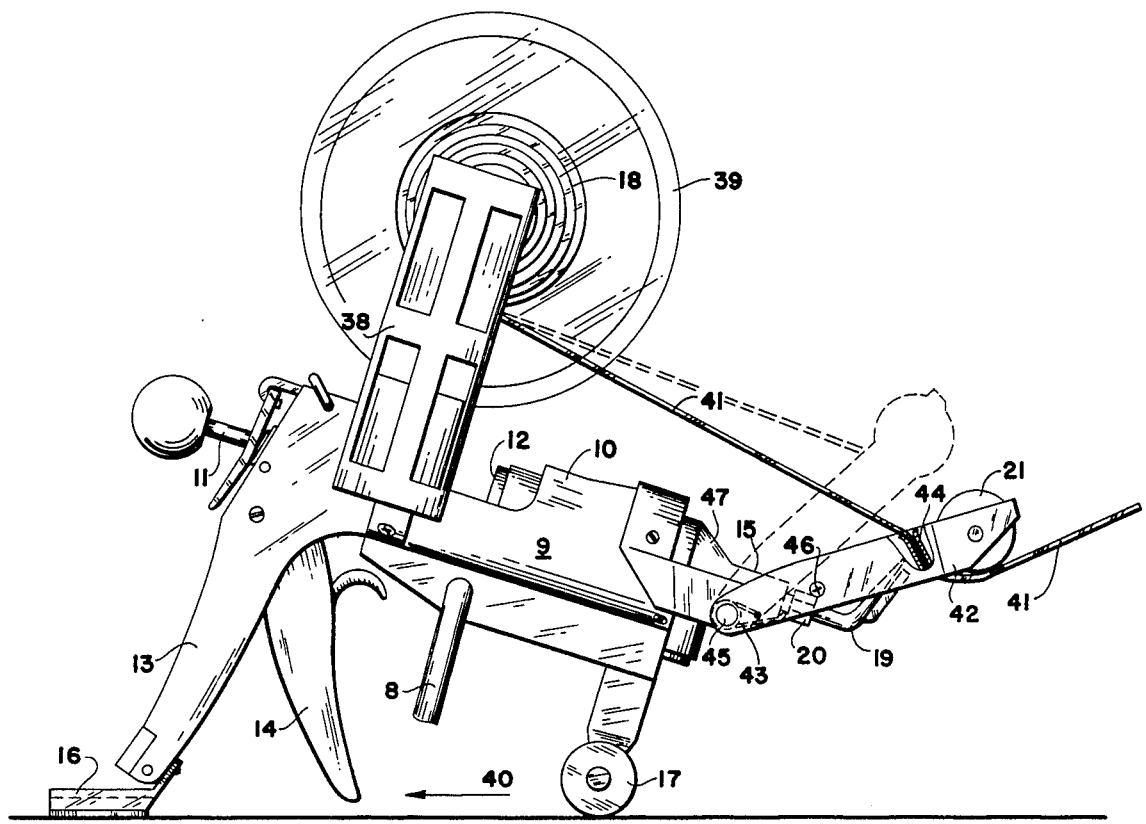
FIG. 1 is a side elevational view of the apparatus in accordance with this invention.
Figure 2:
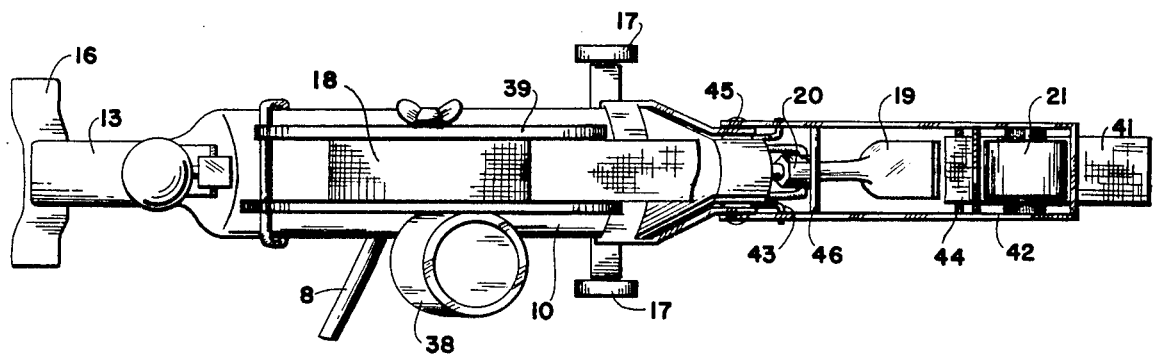
FIG. 2 is a top plan view thereof.

The apparatus of this invention is best seen in FIGS. 1 and 2 and comprises a hot glue dispensing means 10 having a housing 9 for heating glue and selectively dispensing same. A commercially available hot melt glue gun, of the type designated as Hysol 3000 or 4000 made and sold by Hysol Division of the Dexter Corporation of Seabrook, N.H., may be used as the dispensing means 10, and such gun includes a central cavity for receiving a glue cartridge 12 (approximately 2 inches in diameter×2 inches long) which is pushed forward by a follower 11 into an internal heating zone that melts the forward portion of the cartridge and conducts the melted glue at a temperature of 210°–425° F. to a nozzle 15 from which the glue is discharged at a temperature slightly therebelow. The gun 10 has a pistol grip handle 13 and a trigger 14 which, upon being activated by gripping or pulling, provides pressure to force the hot glue out of nozzle 15. The gun 10 is equipped with a check valve (not shown) internally of nozzle 15 to prevent dripping of hot molten glue when trigger 14 is not activated or squeezed toward handle 13. This type of gun is electrically heated by a Calrod unit or the like and powered through cord 8 to a source of 110 volt AC current. As sold commercially, gun 10 is fitted with a nozzle tip designed to deliver a cylindrical bead of molten glue about 0.125 inch in diameter. However, such a nozzle tip is not employed in accord with this invention. The prior art gun 10 is modified, in accordance with this invention, by adding a rear rest 16, front wheel supports 17, glue cartridge storage tube 38, a roll of binder tape 18, a glue applicator 19, and a pressing means, preferably a pressure roller 21, together with all of the auxiliary attachments associated therewith. Rear rest 16 includes a fixed widely spread foot designed to support handle 13 of gun 10 when not in use and to maintain same in the upright position shown. Wheels 17 support the nozzle end of gun 10 when it is not in use, and serve as a rolling support to steady the gun when it is operatively laying down a strip of hot molten glue delivered from glue applicator 19. Preferably, glue gun 10 is pulled in the direction of arrow 40, as will be hereinafter more fully understood by reference to FIG. 11.

Mounted above gun 10 is a roll of tape 18 in a holder 39 which dispenses tape from the roll, as at 41, to pass through tape guide 44 and thence beneath pressing means which presses tape 41 onto the glue treated carpet as explained hereinafter in greater detail. Holder 39 can be of any convenient design which dispenses tape 18 freely but with sufficient resistance to prevent slack or excess tape from piling up between holder 39 and pressing means support frame 42. Support frame 42 is shown in its two extreme positions, solid lines and broken lines, pivoting about pin 45. Support 42 has limited pivoted motion from the full line position to the broken line position due to the frame of support 42 bearing against the conical exterior 47 of gun 10 leading to nozzle 15. Support 42 has a lower limit shown by solid lines by reason of stop pin 46 bearing against union coupling 20 which joins the applicator 19 to nozzle 15. In operation, support 42 is located somewhere between these two extreme positions (see FIG. 1). Spring 43 is biased to maintain support 42 in the position shown in solid lines and thereby to provide pressure for means 21 to press tape 41 onto the carpet pieces to be joined. Tape guide 44 located on support 42 functions to maintain the tape flat and to direct tape 41 to be dispensed immediately beneath means 21. Means 21 is shown in the drawings as a roller, but it is to be understood that a flat ironing surface is equally applicable for this purpose.

Figure 3:
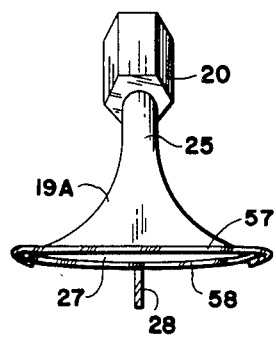
FIG. 3 is a front elevational view of the first glue applicator of this invention.
Figure 4:
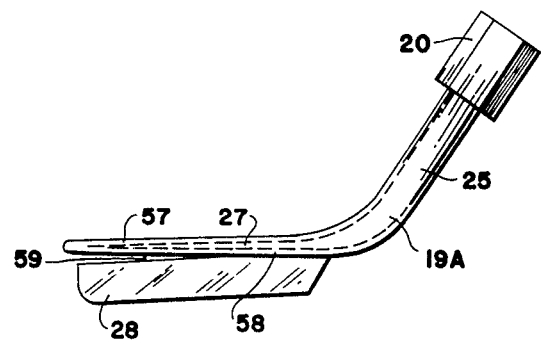
FIG. 4 is a side elevational view of the first glue applicator.
Figure 5:
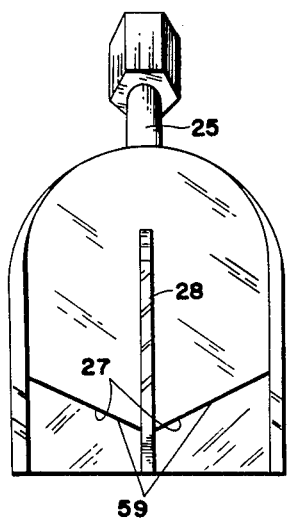
FIG. 5 is a bottom plan view of the first glue applicator.
Figure 6:
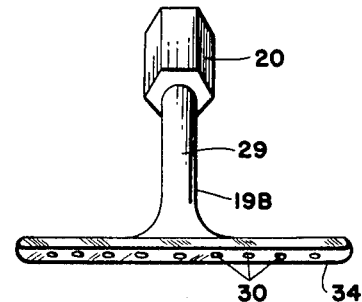
FIG. 6 is a front elevational view of a second glue applicator of this invention.
Figure 7:
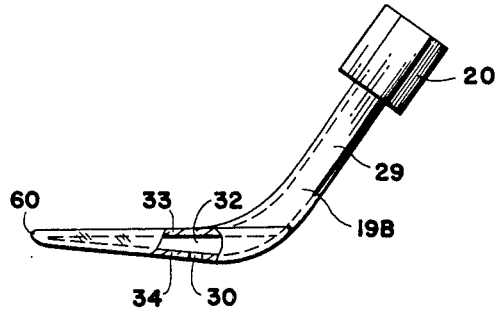
FIG. 7 is a side elevational view of the second glue applicator.
Figure 8:
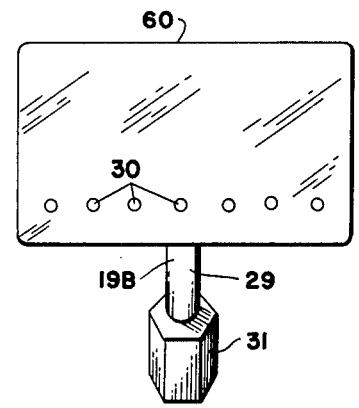
FIG. 8 is a bottom plan view of the second glue applicator.

Glue applicators 19, in accordance with this invention, are shown in greater detail in FIGS. 3–8. There generally are two types which are used for different processes. The applicator 19A in FIGS. 3–5 is employed in joining two rug or carpet sections. The applicator 19B in FIGS. 6–8 is employed in joining two pieces of carpet with the prior art wide paper joining tape, in repairing an installed carpet, or other equivalent operations, such as mending tears in a tent or other large pieces of canvas fabric or the like.

The applicator 19A in FIGS. 3–5 comprises a tubular inlet 25 having a union coupling 20 attached thereto with internal threads for engagement with the external threads on nozzle 15 of glue gun 10. Inlet 25 leads into a wide thin channel section 27 which forms a strip of hot glue in a width to match the width of the binding tape to be used. The channel is the space between an upper plate 57 and a lower plate 58. Lower plate 58 terminates along edge 59 over which the hot molten glue flows onto the carpet backing. Upper plate 57 extends rearwardly of edge 59 and smooths the dispensed glue into a thin strip. On lower plate 58 of channel section 27 is a keel 28 depending downwardly and serves to steady the travel of the applicator 19A between the edges of the backing of the two pieces of carpeting being joined. It is to be understood that the width and length of the applicator 19A may be varied to accommodate the different applications of use thereof.

The applicator 19B in FIGS. 6–8 is employed to join pieces of carpeting using the prior art joining tape that is not preglued and to mend sections of installed carpeting or other large pieces of fabric. This applicator 19B includes a tubular inlet 29 and union coupling 20 identical to corresponding parts of FIG. 4 described above. The glue dispensing section, however, includes an enclosed space 32 between upper plate 33 and lower plate 34 joined around their perimeters into a generally rectangular shape. Glue is dispensed out of a plurality of spaced holes 30 on the lower plate 34. The applicator 19B of FIGS. 6–8 may be made as wide as necessary to dispense a strip of glue in whatever width is appropriate. It has been found desirable, for example, when used to mend tears in tents or other large fabric pieces to employ a wider applicator than that used to mend carpets. Glue is dispensed on the top of the tear, employing a flat backing of any type, e.g., plywood, to hold the torn fabric in place sufficiently for the glue strip to harden and hold the mended fabric in place. A fabric joining strip is not always necessary, although it is preferably used for these applications since it produces a stronger junction. A wide form (2-3 inches) of applicator 19B is employed if it is to be used to joing abutting pieces of carpeting by use of a prior art paper joining tape (approx. 4 inches wide) with a reinforcing fabric lattice lightly glued to the paper backing. This technique requires that hot molten glue be applied to the paper tape, the carpet backing, or both, and then pressed together and held until the glue solidifies.

Figure 9:
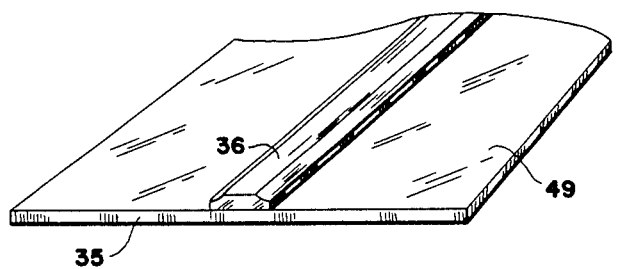
FIG. 9 is a perspective view of undersupport employed with the apparatus of this invention.
Figure 10:
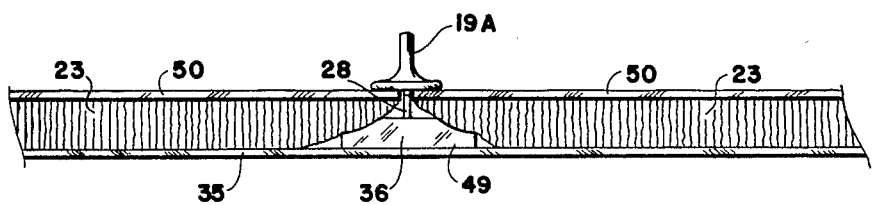
FIG. 10 is a front elevational schematic view of the undersupport in use in joining carpet pieces according to this invention.
Figure 13:
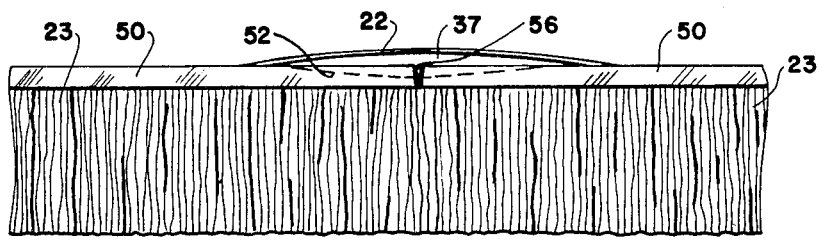
FIG. 13 is a front elevational view showing two pieces of carpeting joined by the process of this invention.

In the joining of carpet pieces, an undersupport 49 is preferred in some instances to produce the best results. Undersupport 49 is shown in FIG. 9 and its use with two carpet pieces to be joined is shown in FIG. 10. The undersupport comprises a flat planar base 35 with a central support 36 for the carpet edges to be joined. Preferably, the cross-section of support 36 is trapezoidal in shape, particularly if the two carpet pieces are beveled at their juncture line as is the case with many designer rugs. The carpet pieces 23 are assembled as shown in FIG. 10 with keel 28 of applicator 19 or FIGS. 3-5 between the edges of the carpet pieces 23. The nap of carpet pieces 23 is placed downward against base 35 with carpet backing 50 being upward. As the glue gun 10 is moved down the juncture line between pieces 23, binding tape is applied to the strip of glue and pressed into the carpet backing 50 to produce a solid bond which may have a slightly rounded surface. When the joined carpet pieces are not beveled, undersupport 49 may or may not be used. Frequently, its use is not necessary when the carpet pile is sufficiently strong to maintain a good support for the glue dispensing gun as it is used in this invention. For softer pile carpets the use of undersupport is preferred. The resulting glue bond structure is very strong and does not break along a line to show the carpet edges even when rolled or bent back along such line as was prevalent and presented great problems with the prior art processes. In FIG. 13 there is shown an enlarged view of the joined carpet pieces 23 along their juncture line with binding tape 22 held in place by glue strip 37. Glue strip 37 permeates well into binding tape 22 and penetrates slightly into carpet backing 50 as shown by dotted line 52 and into space 56 between the abutting edges of the carpet. Particularly, with the glue at the upper temperature level at about 350°-400°, elements in the carpet backing 50 and in tape 22 are softened, causing backing 50, glue 37, and tape 22 to fuse together to produce a strong bond when cooled. While temperatures of glue between 210° and 425° may be employed to make the bond, the upper temperature levels greater than the melting or softening level of the elements in backing 50 (such as the stiffening layer lying near the outside surface of backing 50) and in tape 22 are preferred. It is important that the glue does not entirely permeate completely through the tape 22 in that the roller 21 would become coated with glue and would require not only repeated cleaning but would inhibit the free operation of movement of the apparatus in the intended manner. It has been found to be advantageous to make roller 21 of a nonadherent material such as polytetrafluoroethylene or to cover roller 21 with a tape which can readily be removed when sticky with glue and replaced by a new tape. The final structure of the bond has a slightly rounded surface projecting convexly upward from the plane of backing 50. Glue 37 does not spread laterally outward from the edges of tape 22 in a properly made juncture. The rounded structure provides extra strength to prevent the carpet pieces from breaking along the juncture line as in prior art practice when the carpet is flexed or rolled (sometimes called "grinning"). The thicker center section of glue bond 37 (as shown in FIG. 13) and the glue bonding of the backing edges 56 make the entire area of the juncture at least as strong as the originally manufactured portions of the carpet. This is particularly apparent when the carpet is rolled with the pile on the outside and no separation or "grinning" occurs at the juncture line. This is because the glue joint is stiffer than the adjacent carpet backing and, therefore, does not flex as much. It also has excellent tensile strength and will not separate under the normal stretching involved in wall-to-wall carpet installation procedures. The joining of Berbertex carpeting with prior art procedures frequently results in "peaking" wherein the two joined carpet piles project upwardly along the juncture line, probably due to stresses which are produced in manufacturing this particular type of carpet. The glue bond having the convex shape and thicker portion at the juncture line completely eliminates "peaking" due to the extraordinary strength of the bond.

Figure 11:
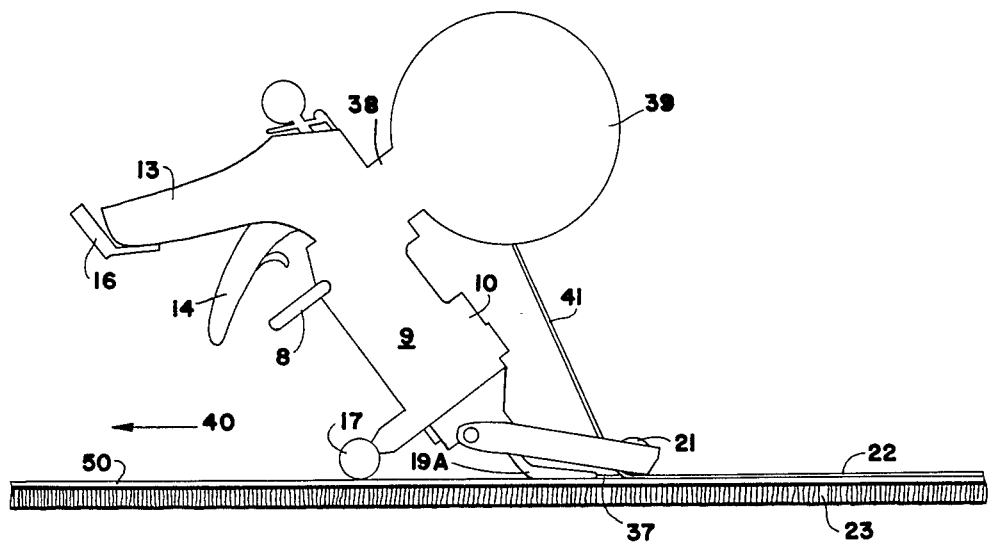
FIG. 11 is a schematic view of the apparatus of this invention employed in the process of joining two pieces of carpet according to this invention.

FIG. 11 illustrates various features of the process according to the invention. Two pieces of carpeting 23 are abutted against each other along juncture line with the carpet backing facing upwardly. A strip of hot molten glue 37 is applied to the carpet backing 50 along juncture line and immediately thereafter a strip of binding tape 22 is applied to strip 37 and pressed downwardly onto backing 50. Hot glue is thereby pressed into backing 50 and also into tape 22. It is important that the glue flow around keel 28 of applicator 19A so as to wet the edges of the juxtaposed carpet pieces 23 and thus fill space 56 with glue. A convenient method of applying glue strip 37 to carpet pieces 23 is by the applicator 19A (FIGS. 3-5) and a convenient method of pressing tape 22 into glue strip 37 and onto carpet backing 50 is by roller 21 (see FIGS. 1-2). It is preferred that the glue be at a temperature of about 350° to 425° F. as it is laid onto carpet backing 50 so as to soften and fuse the polyester stiffening lattice found in the carpet backing and also to soften and fuse the polyester fibers employed in the binding tape 22. At this temperature level the glue causes sufficient softening and fusing of the specified components of the carpet backing and of the binding tape to produce a strong, homogeneous, solid glue joint which is at least as strong as the original carpet backing in both tensile and flexural measurements.

Figure 12:
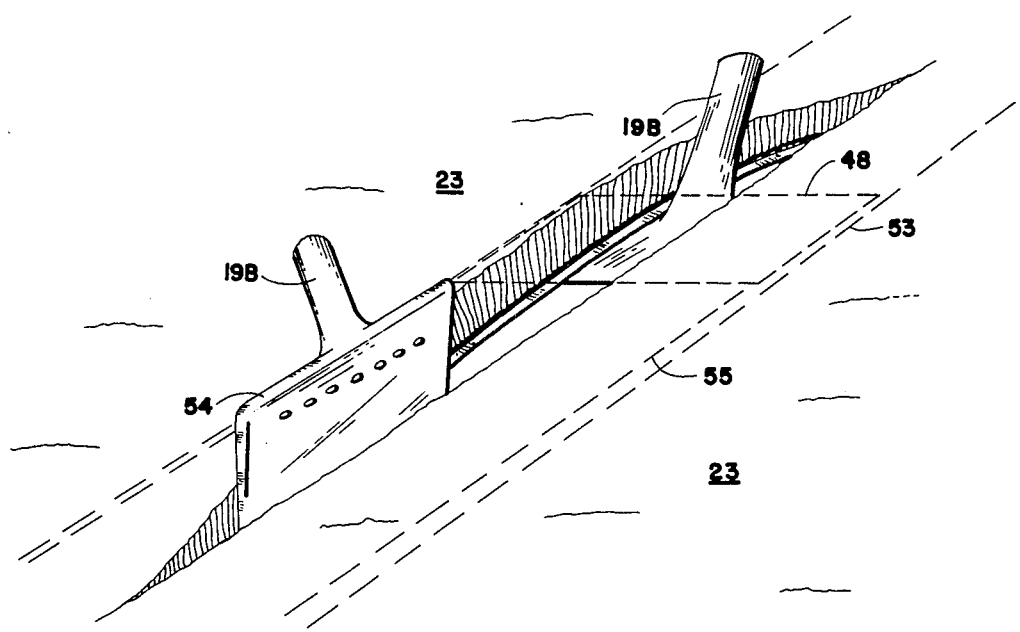
FIG. 12 is a schematic view of the apparatus of this invention employed to mend an installed carpet.

FIG. 12 shows the manner of use of the apparatus of this invention to mend a faulty juncture of two pieces of carpeting installed in a room. Such carpeting has a joining tape 53 underneath the carpeting which has separated from the carpeting so as to leave a gap between the carpet edges. Prior art techniques would require the carpet to be lifted from the floor and a new binding tape applied to the backing at the faulty juncture, or to attempt to apply a bead of hot glue between the carpet backing and the binding tape and press the two together in the hope that the new glue application would hold when cooled and solidified. This is particularly difficult due to the fact that the carpet is stretched to fit the room. In accordance with this invention the apparatus of FIGS. 1 and 2 would be employed, fitted with glue applicator 19B of FIGS. 6-8, but not employing tape roll 18, support frame 42, nor roller 21. Applicator 19B is tipped into position 54 to be slipped into space 23 and then twisted into position 48 to provide a wide glue strip 55 as applicator 19B is pulled along the length of the portion to be mended. Preferably, the apparatus is tilted (as shown in FIG. 11) with only the trailing edge 60 (see FIGS. 6–8) of applicator 19B touching joining tape 53. This permits glue to come out of holes 30 and to be spread smoothly by trailing edge 60 into an appropriate glue strip underneath to adhere the carpet backing to the joining tape. The applicator 19B is removed by reversing the operation for entering between the carpet edges, and the carpet edges are pressed down on the glue strip 55 to provide a good bond between the carpet backing and the pre-existing prior art glued paper tape 53 or the like.

Figure 14:
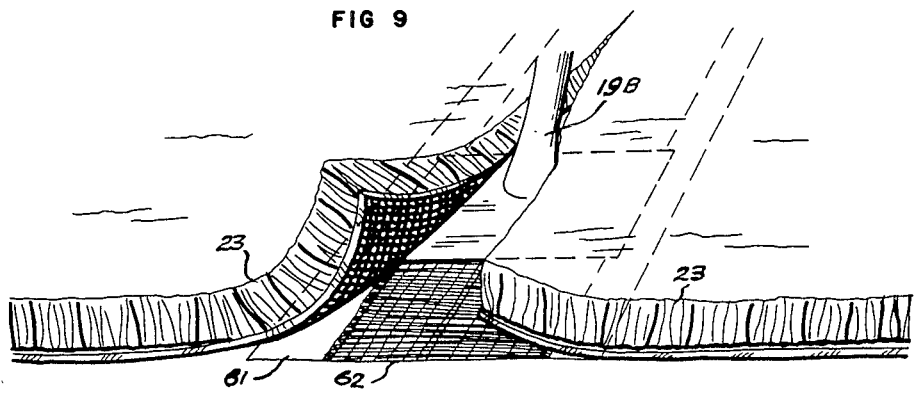
FIG. 14 is a schematic view of the apparatus of this invention employed to join two pieces of carpet with a prior art joining tape.

In FIG. 14 there is shown the use of the apparatus of this invention in joining two abutting pieces of carpeting using the prior art joining tape. Joining tape 61 comprises a strip of paper 4 inches wide on which is glued a coarse fibrous net or lattice structure 2½ inches wide. This tape is placed on the floor or any flat supporting surface with the net structure 62 facing up. The two abutting pieces of carpeting 23 are placed on top of tape 61 with the abutting edges centered on the net structure of the tape. The glue gun 10 is fitted with a large applicator 19B. Applicator 19B as used in repairing a faulty juncture shown in FIG. 12 is about 1½ inches wide while such an applicator for the present procedure must be about 2½ inches wide so as to spread glue over the entire width of net structure of tape. Other than the larger width applicator 19B is exactly the same design as that shown in FIGS. 6–8. Applicator is placed between the backing of the abutting carpet pieces 23 and the net structure 62 of tape 61. Hot glue is forced out the holes in the bottom of the applicator 19B which is tipped upward slightly so that trailing edge is pressed against net structure 62 as glue gun 10 is pulled along the juncture line and leaves a continuous strip of molten glue covering net structure as glue gun is pulled along leaving glue on tape 61 the abutting pieces of carpeting 23 are pressed down onto the glue strip and held in place until the glue solidifies, which is only a matter of a few seconds, and the carpet joining is completed.

It is to be understood that several modifications and variations are applicable to this invention. The glue which is employed may be that which is molten at temperatures from about 210° F. to about 425° F. The temperature of the molten glue is important with respect to the materials employed in the carpet backing and in the joining tape. If there are elements in the carpet backing and/or in the joining tape which will soften and become fusible at 300° F. it is preferred that the glue be applied at a temperature, perhaps 325°–350° F., which will be capable of penetrating the backing and the tape to reach those fusible elements and cause them to become fused with the cooling glue. A glue joint that has caused fusing of the carpet backing and the joining tape is much stronger than one which caused no fusing. If there is no fusing to occur it is unnecessary to employ temperatures any higher than enough to cause the glue to flow readily to the desired strip. This, for example, may be the case when mending a faulty juncture as described with reference to FIG. 12.

The process and apparatus of this invention is applicable for bonding a wide variety of carpets, e.g., Axminster, Karastan, Velvet, Wilton, etc. It can also be used with greatly improved results on Berbertex carpeting to prevent peaking of the seaming which occurs with prior art procedures. Indoor-outdoor needle punch carpeting can be joined by the process and apparatus of this invention, which was not possible with prior art procedures because the application of a hot iron to the nap caused some undesirable melting of the carpet itself. The apparatus can be made in different sizes so as to be suitable for turning sharp corners and following tight curves that could not be done when using wide paper backed joining tapes.

The joining tape used in this process can be of several types and sizes although for most operations, widths of ¾ to 1½ inches are sufficient. The tape preferably is a fabric of polyester fibers. Other types of fibers may be employed as long as the tape has sufficient tensile strength and the fibers are heat softenable and fusible at about 210° F. to about 400° F.

A preferred glue is a polyolefin base material melting at about 200° F. to 220° F. to a transparent liquid having a viscosity of about 20–100 poise at 350° F. Typical of such a glue is the Hysol Hot Melt Adhesive made and sold by Hysol Division of The Dexter Corporation of Seabrook, N.H.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for joining two pieces of carpet abutting along a juncture line, each piece of carpet having a backing which faces upwardly, the apparatus comprising hot glue dispensing means in a housing having a nozzle for dispensing hot molten glue, a manually operable valve means connected to said nozzle for selectively releasing a hot molten glue through said nozzle, means for supporting a roll of uncoated joining tape on said housing to dispense uncoated tape to a position rearwardly of said nozzle, said tape being sufficiently wide to extend laterally over a portion of both pieces of carpet adjacent the juncture line, a glue applicator attached to said nozzle, said applicator having a hollow inlet operatively connected to said nozzle, said hollow inlet communicating with a broad, thin channel outlet means having gnerally the same width as that of the tape and adapted to deposit a strip of molten glue to the backing of each piece of carpet such that the total width of the glue strip is substantially the same as the width of said tape, and tape pressing means attached to said housing rearwardly of said applicator for pressing the tape onto the unspread deposited strip of molten glue and to cause the strip of molten glue to penetrate into the backing without any substantial contact between said glue strp and said tape pressing means.

2. The apparatus of claim 1 wherein the joining tape contains thermoplastic filaments dispersed therein.

3. The apparatus of claim 1 wherein said glue applicator includes a thin element depending from said channel outlet means substantially midway of the width thereof for insertion between the juxtaposed edges of the pieces of carpet and for guiding said apparatus along the juncture line between the pieces of carpet and for introducing glue to said juxtaposed edges.

4. The apparatus of claim 1 further including a pair of spaced supporting rotatable wheels beneath and connected to said housing adjacent said nozzle.

5. The apparatus of claim 1 wherein said applicator comprises an upper plate and a lower plate sealed to each other along lateral edges thereof and defining a thin, wide space therebetween communicating with said hollow inlet at the upstream end of the space and having a thin, wide dispensing opening at the downstream end of the space, and a thin keel depending downwardly from the outside of said lower plate in a lengthwise direction adapted to be inserted between the juxtaposed edges of the pieces of carpet.

6. The apparatus of claim 1 wherein said applicator comprises an upper plate and a lower plate of generally rectangular shape sealed to each other around the entire perimeter and defining a thin space therebetween communicating with said hollow inlet, the lower plate having a plurality of passageways therethrough spaced laterally across said lower plate and adjacent said hollow inlet to evenly supply molten glue across the backing of each piece of carpet.

7. The apparatus of claim 1 further including a handle grip mounted on said housing and spaced from said nozzle, said handle grip extending downwardly and having a lower end portion, a support member mounted in said end portion and extending laterally outward therefrom for supporting said apparatus in its inoperative position at rest.

8. The apparatus of claim 1 further including a cylindrical holder for storing a plurality of cylindrical sticks of solidified glue for use in said apparatus.

9. The apparatus of claim 1 in combination with a support member having a central raised portion adapted to underlie said pieces of carpet along the juncture line to facilitate the introduction of molten glue to the juxtaposed edges of said backing layer of said carpet pieces.

10. The apparatus of claim 1 further including a pair of spaced supporting rotatable wheels beneath and connected to said housing adjacent said nozzle, a handle grip mounted on said housing and spaced from said nozzle, said handle grip extending downwardly and having a lower end portion, a support member mounted on said end portion and extending laterally outward therefrom for supporting said apparatus in its inoperative position at rest.

11. The apparatus of claim 1 wherein said means attached to said housing includes a spring loaded roller biased to forcibly press downwardly on the upper face of the joining tape.

12. The apparatus of claim 11 further comprising support means for connecting said roller to said housing, guide means mounted on said support means forwardly of said tape pressing means for guiding the tape from the roll of tape to maintain the tape beneath said tape pressing means as said apparatus is being moved with said tape pressing means at the trailing end.

13. The apparatus of claim 12 wherein said tape pressing means is a roller.

14. The apparatus of claim 12 wherein said tape pressing means is a flat ironing surface.

15. An apparatus for applying a strip of hot molten glue to two abutting pieces of fibrous material along the juncture line between the abutting pieces, the apparatus comprising a hot glue dispensing means in a housing having a hot glue dispensing nozzle, a manually operable valve means connected to the nozzle for selectively releasing the glue through said nozzle, and a glue applicator attached to said nozzle as an extension thereof, said applicator having a hollow interior for receiving the glue from said nozzle and a substantially flat lower surface with a plurality of glue dispensing passageways therethrough communicating with said hollow interior, said lower surface extending laterally on both sides of said nozzle so that glue egressing from said passageways will simultaneously be deposited on both sides of said nozzle.

16. The apparatus of claim 15 wherein said lower surface is substantially rectangular with said passageways being spaced across the breadth of said surface lateral to the operative direction of movement of said apparatus.

17. The apparatus of claim 15 which additionally includes means for supporting a roll of uncoated joining tape mounted on said housing to continuously dispense uncoated tape rearwardly of said applicator, and a tape pressing means mounted on said housing to continuously press the dispensed tape onto the strip of glue dispensed from said applicator with substantially no contact between said glue and said tape pressing means.

18. The apparatus of claim 17 wherein said means to continuously press tape is a spring loaded roller.

19. The apparatus of claim 15 which additionally includes a pair of spaced supporting rotatable wheels beneath and connected to said housing adjacent said nozzle, a handle grip mounted on said housing and spaced from said nozzle, said handle grip extending downwardly and having a lower end portion, a support member mounted on said end portion and extending laterally outward therefrom for supporting said apparatus in its inoperative position at rest.

20. The apparatus of claim 15 further including a cylindrical holder for storing a plurality of cylindrical sticks of solidified glue for use in said apparatus.

21. The apparatus of claim 15 in combination with a support member having a central raised portion adapted to underlie said pieces of carpet along the juncture line to facilitate the introduction of molten glue to the juxtaposed edges of said backing layer of said carpet pieces.

* * * * *